United States Patent Office 3,185,546
Patented May 25, 1965

3,185,546
PREPARATION OF ANHYDROUS LITHIUM PEROXIDE
Ricardo O. Bach and William W. Boardman, Jr., Gastonia, N.C., assignors to Lithium Corporation of America, Inc., New York, N.Y., a corporation of Minnesota
No Drawing. Filed Oct. 19, 1962, Ser. No. 231,865
15 Claims. (Cl. 23—184)

This invention relates to an improved method of producing substantially anhydrous lithium peroxide.

Methods for the production of substantially anhydrous lithium peroxide have long been known in the art, among the more recent of such methods being those disclosed, for instance, in U.S. Patents Nos. 2,488,485 and 2,962,358. Heretofore known prior art methods possess certain significant disadvantages, particularly from an economic standpoint, which make their utilization in commercial operations open to practical difficulties. Thus, for example, in those methods wherein formation of the lithium peroxide is accomplished in an organic liquid medium, for instance, n-propanol, large quantities of the n-propanol are required to produce only a modest amount of the peroxide, generally of the order of 15 to 20, and as high as 50 or more, parts by weight of n-propanol being utilized to prepare only 1 part of anhydrous lithium peroxide. Moreover, certain of said prior art procedures involve the use of substantial quantities of hydrogen peroxide in relation to the lithium hydroxide reacted therewith to form the lithium peroxide, of the order of about 2½ times the theoretical or stoichiometric amount, which increases significantly the raw material costs of the method.

Heretofore known methods of producing lithium peroxide, as exemplified by the aforementioned U.S. patents, have commonly involved the utilization of means for upsetting the equilibrium of the reaction to drive it to the formation of the lithium peroxide. This has been accomplished, for instance, by carrying out the reaction between the lithium hydroxide and the hydrogen peroxide in an organic liquid and removing the water present, either that introduced as a solvent for the reactants or formed in the course of the reaction, by simple distillation of the reaction mixture, or by employing an organic solvent in which to conduct the reaction, the water present in the reaction zone being soluble in the solvent and the lithium peroxide formed being insoluble therein. The economic disadvantages associated with the practice of such known procedures have been alluded to hereinabove.

In accordance with the practice of the present invention, substantially anhydrous lithium peroxide of high purity and in excellent yield is obtained by a novel and simple method which includes reacting lithium hydroxide and hydrogen peroxide in an essentially aqueous medium under conditions described hereinafter in detail. This result is achieved in accordance with the broader aspects of this invention by employing lithium hydroxide and hydrogen peroxide in concentrations such that the weight ratio of water present in the reaction mixture to lithium peroxide formed in the reaction zone is in the range of about 2:1 to about 5:1.

The lithium hydroxide is utilized in the form of a solid and may be anhydrous in character, or, more desirably, as a hydrate such as lithium hydroxide monohydrate having a lithium hydroxide content of 50% to 60%, usually about 55%, more or less. In order to reduce to a minimum the quantity of insoluble impurities such as, for instance, lithium carbonate, present in the aqueous reaction zone, it is preferred to use lithium hydroxide substantially free of carbonates or other impurities.

The hydrogen peroxide component employed in the reaction may vary considerably in strength, for instance as an aqueous solution of strength of about 27% to about 98%, with excellent results being attained with about 30% to 70% aqueous hydrogen peroxide. There is a number of aqueous solutions of hydrogen peroxide available commercially having utility for the purposes of this invention. Among these are the product sold under the trade designation "Perone 30" which, as indicated by the associated numeral "30," is a 30% hydrogen peroxide solution; and the products sold under the trademark "Becco," which products comprise aqueous hydrogen peroxide solutions of strength ranging anywhere from 27.5% to 92.9%.

The proportions of the lithium hydroxide and the hydrogen peroxide present in the reactants used in the practice of the method of the present invention can be varied. In accordance with a preferred embodiment of the invention, approximately stoichiometric or theoretical proportions of the lithium hydroxide and the hydrogen peroxide, namely, a lithium hydroxide to hydrogen peroxide molar ratio of about 2:1, are employed, with especially satisfactory results being obtained when the lithium hydroxide component is used in slight excess, or in a molar ratio of lithium hydroxide to hydrogen peroxide of the order of 2 to 2.8 of the lithium hydroxide to 1 of the hydrogen peroxide.

To obtain the desired lithium peroxide, the lithium hydroxide and the aqueous hydrogen peroxide advantageously are simply mixed together in a suitable reaction vessel. The formation of the lithium peroxide in accordance with the practice of this invention occurs in a sequence of reproducible phenomena readily observable within the reaction zone. The reaction between the lithium hydroxide and the hydrogen peroxide goes through two distinct stages, namely, an initial exothermic reaction stage, followed by an endothermic reaction stage.

The initial exothermic reaction between the lithium hydroxide and the hydrogen peroxide is manifested by a rapid rise in the temperature of the reaction mixture or slurry. The heat of the reaction during this initial stage in the formation of the lithium peroxide drives the temperature of the slurry from room temperature generally to about 50° to 70° C. The slurry remains at this higher temperature range for a short time, usually of the order of 1 to 5 minutes, more or less, after which an almost immediate change in color occurs in the solid phase present in the slurry. This change in color generally manifests itself by a transformation of the original, essentially pure white color of the solid phase to a light tan color. The color change is concurrent with the second stage of the reaction which is manifested by the occurrence of a significant lowering of the temperature of the slurry to about room temperature, more usually to about 30° to 40° C. This temperature drop is quite rapid, occurring in many instances in less than 1 minute but, more generally, in from 1 to about 5 to 7 minutes. The lowering of the temperature in the reaction zone is accompanied by a noticeable change in the viscosity of the slurry. Whereas, initially, the aqueous solution of the lithium hydroxide and the hydrogen peroxide is rather viscous, the temperature drop in the reaction zone results in a concomitant lowering in the viscosity of the slurry to a state suggestive of that of water. At this stage of the method of the present invention, the solid phase in the slurry is essentially the desired lithium peroxide, which readily can be separated from the slurry by known filtration procedures, and dried.

The aqueous filtrate obtained after separation of the solid phase from the slurry usually contains in a dissolved state small amounts of lithium hydroxide and lithium peroxide. It has been found that the loss of these residual solubility values, particularly the lithium peroxide values, can be substantially reduced by following certain hereinafter discussed procedures which constitute additional and significant aspects of the present invention.

In connection with the above, there are set forth below tables showing solubility measurements of $Li_2O_2$ in water, in methanol, and in water in the presence of incremental quantities of LiOH.

Table I contains the values of grams/liter of lithium peroxide in water at different temperatures.

TABLE I

| Temp. °C.: | G./l. of $Li_2O_2$ |
| --- | --- |
| 20 | 100 |
| 30 | 94 |
| 40 | 90 |
| 50 | 80 |
| 60 | 75 |

The simultaneous presence of lithium hydroxide depresses the values of $Li_2O_2$ in solution. In the following Table II this is shown by the analytical composition of solutions at room temperature, saturated with respect to lithium peroxide.

TABLE II

| G./l. $Li_2O_2$: | G./l. LiOH |
| --- | --- |
| 93.5 | 3.6 |
| 63.0 | 50.8 |
| 53.2 | 68.3 |
| 42.8 | 87.8 |
| 31.6 | 99.0 |

The solubility of $Li_2O_2$ in methanol is 3.5 g. per liter, and in ethanol is approximately naught. It will, thus, be seen that the presence of such solvents in the slurries referred to above will decrease materially and substantially the content of $Li_2O_2$ in the filtrate and will thereby increase the yield.

Since lithium peroxide is soluble in water, and since the formation of the lithium peroxide is carried out, in accordance with the method of this invention, in an aqueous medium, it is desirable that the weight ratio of the water present in the medium to the lithium peroxide be maintained at low levels. This can be achieved by employing strong solutions of hydrogen peroxide, for example, aqueous solutions of strength of 50% to 98%, especially desirably above about 80%. Under such conditions, the weight ratio of water to lithium peroxide in the aqueous medium will fall within the range of about 2:1 to 3:1, a circumstance which will tend to retard solubilization of the lithium peroxide in the aqueous medium.

Depression of the soluble active oxygen values in the aqueous medium in which the formation of the lithium peroxide is carried out in accordance with the method of the present invention can be further advantageously achieved by the utilization of lithium hydroxide in slight excess over the stoichiometric proportions required to produce lithium peroxide. This practice markedly increases yields based on active oxygen values, and enables the production of lithium peroxide in purity of 97% and better.

The excess of lithium hydroxide in the aqueous medium in which the lithium peroxide is formed can be varied within appreciable limits. The generally optimum objectives of this aspect of the present invention, however, are most advantageously attained when the lithium hydroxide component is utilized in a molar ratio of lithium hydroxide to hydrogen peroxide greater than 2:1 and can be as high as 3:1. The excess lithium hydroxide employed for the purpose of depressing the solubility of active oxygen values in the aqueous medium can be conveniently recovered from the filtrate by conventional evaporation techniques.

Furthermore, and as indicated above, losses of active oxygen values also can be advantageously held at low levels by the addition of an organic liquid to either the mother liquor obtained from the filtration of the solid phase from the aqueous slurry, and recovering the lithium peroxide as a precipitate, or, and especially desirably, to the slurry itself prior to the separation of the solid phase from the slurry. The organic liquids utilized should, of course, be substantially unreactive with respect both to the reactants, that is, the lithium hydroxide and the hydrogen peroxide, as well as with respect to the lithium peroxide formed by the reaction thereof, and be essentially a non-solvent for the lithium peroxide and should be soluble and/or miscible with water. A number of organic liquids enable the fulfillment of the objectives of this aspect of the present invention and include, for instance, such lower alkyl alcohols as methanol and ethanol as mentioned above, and the propanols, and the like, heterocyclic amines as exemplified by pyridine, and ketones such as methyl ethyl ketone and diethyl ketone.

The quantity of organic liquid necessary to depress the solubility of the lithium peroxide in the aqueous medium may vary considerably. The organic liquid-to-water volume ratio should be between 1:2 and 2:1.

It is to be understood that the present invention contemplates the utilization of the forgoing novel procedures individually or in any combination for increasing yields of active oxygen values. Ths will be made clear by the following specific examples which are illustrative but in no way limitative of the invention:

*Example 1*

59 grams of 46.4% $H_2O_2$ (74% of that required stoichiometrically) were mixed quickly into 94.4 grams of $LiOH.H_2O$ (55.3% LiOH) while stirring vigorously. The temperature rose to 65° C. and remained there for 2 minutes and fell to 30° C. about 2 minutes after the color of the slurry had changed from a snow white to a tan color. After 10 minutes of stirring to ensure that the slurry had been thoroughly mixed, 23.4 grams of 46.4% $H_2O_2$ were added (29.4% of that required stoichiometrically). The temperature rose to 45° C. After 20 minutes of stirring, 50 ml. of methyl alcohol were added. The temperature rose from 35° to 40° C. and the tan color lightened noticeably.

After the slurry had cooled to about 30°, it was pressure filtered, reslurried with 30 ml. of methyl alcohol, filtered, washed with 25 ml. of pentane, filtered and vacuum dried for 2 hours at 30–55° C. This product weighed 43.3 grams and assayed at 33.8% active oxygen, or 97.2% $Li_2O_2$.

*Example 2*

127 grams of "Perone 30" (30% hydrogen peroxide without stabilizers) were mixed into 130 grams of $LiOH.H_2O$ (55.3% LiOH) which is an excess of 33.9%. About 1 minute after this addition the temperature had risen to 54° C., the slurry color started turning from white to cream and the viscosity began to decrease. In 1 more minute the temperature had dropped to 32° C. Twenty minutes after the reactants had been mixed, 280 ml. of methanol were added to the slurry, which was pressure filtered after stirring for 20 minutes. The product was reslurried with 31 ml. of methanol, filtered after standing 10 minutes, reslurried with 30 ml. of methanol, filtered after 10 minutes and dried in a dry, $CO_2$-free air stream as the temperature was programmed over a range of 24° to 107° C. in eight hours. The product weighed 51.3 g. and assayed at 33.6% active oxygen.

*Example 3*

79.9 grams of 46.4% $H_2O_2$ were mixed into 130 grams of $LiOH.H_2O$ (55.3% LiOH) which is an excess of 37.6%. The previously mentioned alterations in viscosity, color and temperature were observed. Twenty minutes after the $H_2O_2$ addition, 202 ml. of methanol were added to the slurry which was pressure filtered after stirring for 20 minutes. The product was reslurried with 32 ml. of methanol, filtered after standing 10 minutes, reslurried with 30 ml. of methanol, filtered after 10 minutes, and dried in a dry, $CO_2$-free air stream as the temperature was programmed over a range of 25° to 115° C. in 7 hours. The product weighed 51.8 g. and assayed at 32.8% active oxygen.

Example 4

123.3 grams of "Perone 30" (30% hydrogen peroxide) were mixed into 95 grams of $LiOH.H_2O$ (55.3% LiOH) which was 0.8% excess. Twenty minutes after the $H_2O_2$ addition, 168 ml. of methanol were added to the slurry which was pressure filtered after stirring for 20 minutes. The product was reslurried with 30 ml. of methanol, filtered after standing for 10 minutes, reslurried with 31 ml. methanol, filtered after standing 10 minutes, and dried in a dry, $CO_2$-free air stream as the temperature was programmed over a range of 25° to 65° C. in 4 hours. The drying of the product was continued for 2¼ more hours as the temperature was gradually raised from 69° to 125° C. The product weighed 41.7 g. and assayed at 33.6% active oxygen.

Example 5

81.2 grams of 46.4% $H_2O_2$ were mixed into 95 grams of $LiOH.H_2O$ (55.3% LiOH) which was 1.0% deficient in the LiOH required to react with the $H_2O_2$ present. The course of this reaction was less rapid than previous ones, and some frothing occurred; however, the pattern of the various stages of the reaction was the same. Twenty minutes after the $H_2O_2$ addition, 208 ml. of methanol were added to the slurry which was pressure filtered after stirring for 24 minutes. The product was reslurried with 33 ml. methanol, filtered after standing for 10 minutes, reslurried in 30 ml. of methanol, filtered after standing 10 minutes and dried in a dry, $CO_2$-free air stream as the temperature was programmed over a range of 23° to 104° C. in 4 hours. The product weighed 46 grams and assayed at 33.4% active oxygen.

Example 6

42.0 grams of 84% $H_2O_2$ were mixed into 95 grams of $LiOH.H_2O$ (55.3% LiOH) which was 5.5% in excess of that required by stoichiometry. Twenty minutes after the addition of the $H_2O_2$, 165 ml. of methanol were added to the slurry which was pressure filtered after stirring for 32 minutes. The product was reslurried with 30 ml. of methanol, filtered after standing 24 minutes, reslurried with 30 ml. of methanol, filtered after standing 10 minutes, and dried in a dry, $CO_2$-free air stream as the temperature was programmed over a range of 25° to 109° C. in 3 hours. The product weighed 46.6 g. and assayed at 33.9% active oxygen.

Example 7

38 grams of 92.9% $H_2O_2$ were mixed into 95 grams of $LiOH.H_2O$ (55.3% LiOH) which was 5.3% in excess of that required by stoichiometry. Thirty-four minutes after the addition of the $H_2O_2$, 85 ml. of methanol were added to the slurry which was then pressure filtered after stirring for 20 minutes. The product was reslurried with 30 ml. of methanol, filtered after standing 10 minutes, reslurried with 30 ml. of methanol, filtered after standing 10 minutes, and dried in a dry, $CO_2$-free air stream as the temperature was programmed over a range of 25° to 115° C. in 2½ hours. The product weighed 47.2 grams and assayed at 33.5% active oxygen.

Example 8

1,155 grams of 28.5% $H_2O_2$ were stirred into 1,250 grams of $LiOH.H_2O$ (55.3% LiOH) contained in a 5 liter resin pot. The temperature rose to 60° C. and fell to 30° C. within 8 minutes of the addition. Then, 1,250 grams of $LiOH.H_2O$ were stirred into the slurry followed by 1,155 grams of 28.5% $H_2O_2$. The temperature rose to 41° C. and fell to 33° C. within 2 minutes after the $H_2O_2$ addition. Again, 1,250 grams of $LiOH.H_2O$ were stirred into the slurry, followed by 1,155 grams of 28.5% $H_2O_2$, and the temperature rose to 38° C. and fell to 30° C. in 2 minutes. The slurry temperature was slowly raised from 30 to 42° C. in one hour. After cooling to 35° C., the slurry was allowed to settle, the supernatant liquor was decanted from the solid, which was centrifuged and washed with water on the centrifuge. Since the 1,508 grams of the moist product obtained contained some LiOH, probably as adsorbed reaction liquor, it was reslurried with 850 ml. $H_2O$ and 173 grams of 28.5% $H_2O_2$, and heated from 24° C. to 50° C. over a 2½ hour period. This slurry was centrifuged after decantation and was washed with small amounts of water on the centrifuge. 1,213 g. of wet $Li_2O_2$ assaying at 33.3% active oxygen was obtained. The centrifuged product was dried in a 2 liter resin pot, heated with a Glas-Col heating mantle. While the $Li_2O_2$ was stirred, dry $CO_2$-free air was passed up through the moist product and the temperature was gradually raised from 28° to 85° C. over a 2 hour period. The $Li_2O_2$ obtained weighed 1,184 grams and assayed at 33.5% active oxygen.

Example 9

605 grams of 70% $H_2O_2$, prepared from 97.8% $H_2O_2$ were stirred into 1,265 grams of $LiOH.H_2O$ (55.8% LiOH) contained in a 5-liter resin pot. The $H_2O_2$ was poured around the edges of the stirring $LiOH.H_2O$ and admixing was assisted manually by means of a heavy glass rod. The temperature rose to 82° C. in 2 minutes and fell to 33° C. in 6 minutes. 1,206 grams of $LiOH.H_2O$ were stirred into the slurry and, after 430 grams of 97.8% $H_2O_2$ were added, the temperature rose to 44° C. and fell to 31° C. in 4 minutes. This same procedure was followed until a total of 4,884 grams of $LiOH.H_2O$ and 1,730 grams of 97.8% $H_2O_2$ (including that used to prepare the 70% $H_2O_2$) had been added. Then, the slurry was heated over a range of 40–52° C. for 45 minutes, decanted and centrifuged. The product was washed on the centrifuge with water. The moist $Li_2O_2$ weighed 2,150 grams and assayed at 32.7% active oxygen.

The drying was accomplished in the same manner as in the preceding run. The product weight was 2,035 grams, assaying at 33.2% active oxygen.

The following is a summary of the data obtained from the foregoing examples:

TABLE III

| Exp. No. | Reactants | | $H_2O$ (ml.) | MeOH in Slurry (ml.) | Product | | |
|---|---|---|---|---|---|---|---|
| | LiOH (mol) | $H_2O_2$ (mol) | | | Weight (g.) | $Li_2O_2$ (Percent) | Yield $O_a$ on reactant (Percent) |
| 1 | 2.18 | 1.12 | 125 | 50 | 43.3 | 96.9 | 82.1 |
| 2 | 3.00 | 1.12 | 187 | 280 | 51.3 | 96.6 | 96.2 |
| 3 | 3.00 | 1.09 | 140 | 202 | 51.8 | 94.3 | 97.9 |
| 4 | 2.20 | 1.09 | 168 | 168 | 41.7 | 96.6 | 80.4 |
| 5 | 2.20 | 1.11 | 125 | 208 | 46.0 | 96.0 | 86.8 |
| 6 | 2.20 | 1.04 | 86 | 165 | 46.6 | 97.4 | 95.1 |
| 7 | 2.20 | 1.04 | 82 | 85 | 47.2 | 96.4 | 95.1 |
| 8 | 86.5 | 30.6 | 6,384 | 0 | 1,184 | 96.4 | 81.6 |
| 9 | 113.5 | 49.7 | 4,163 | 0 | 2,035 | 95.5 | 84.8 |

While the invention has been described in detail, it will be understood that various modifications may be made in the light of the teachings herein without departing from the spirit and scope of the invention.

What is claimed is:

1. A method of producing substantially anhydrous lithium peroxide comprising forming a reaction mixture consisting essentially of a water solution of hydrogen peroxide and a solid lithinum hydroxide, the concentration of the hydrogen peroxide and the lithium hydroxide in the mixture being such as to give a weight ratio of water present in the mixture to lithium peroxide formed by the reaction of the hydrogen peroxide with the lithium hydroxide of from about 2:1 to about 5:1, permitting the hydrogen peroxide and the lithium hydroxide to react at the ambient temperature of the mixture, and drying the lithium peroxide.

2. A method of producing substantially anhydrous lithium peroxide comprising forming a reaction mixture consisting essentially of a water solution of hydrogen peroxide and a solid lithium hydroxide, the concentration at the hydrogen peroxide and the lithium hydroxide in the mixture being such as to give a weight ratio of water present in the mixture to lithium peroxide formed by the reaction of the hydrogen peroxide with the lithium hydroxide of from about 2:1 to about 5:1, permitting the hydrogen peroxide and the lithium hydroxide to react at the ambient temperature of the mixture until a change in color is observed in the mixture, separating the lithium peroxide formed from the mixture, and drying the separated lithium peroxide.

3. A method of producing substantially anhydrous lithium peroxide comprising forming a reaction mixture consisting essentially of a water solution of hydrogen peroxide and a solid lithium hydroxide, the concentration of the hydrogen peroxide and the lithium hydroxide in the mixture being such as to give a weight ratio of water present in the mixture to lithium peroxide formed by the reaction of the hydrogen peroxide with the lithium hydroxide of from about 2:1 to about 5:1, permitting the hydrogen peroxide and the lithium hydroxide to react at the ambient temperature of the mixture, contacting the mixture with a water-soluble organic liquid in which the lithium peroxide is substantially insoluble, separating the lithium peroxide formed from the mixture, and drying the separated lithium peroxide.

4. A method of producing substantially anhydrous lithium peroxide comprising forming a reaction mixture consisting essentially of a water solution of hydrogen peroxide and a solid lithium hydroxide, the concentration of the hydrogen peroxide and the lithium hydroxide in the mixture being such as to give a weight ratio of water present in the mixture to lithium peroxide formed by the reaction of the hydrogen peroxide with the lithium hydroxide of from about 2:1 to about 5:1, permitting the hydrogen peroxide and the lithium hydroxide to react at the ambient temperature of the mixture, contacting the mixture with a water-soluble organic liquid in which the lithium peroxide is substantially insoluble, the volume ratio of organic liquid to water present in the mixture being about 2:1 to about 1:2, separating the lithium peroxide formed from the mixture, and drying the separated lithium peroxide.

5. A method of producing substantially anhydrous lithium peroxide comprising forming a reaction mixture consisting essentially of a water solution of hydrogen peroxide and a solid lithium hydroxide, the lithium hydroxide being in slight excess over stoichiometric proportions required to produce lithium peroxide, the concentration of the hydrogen peroxide and the lithium hydroxide in the mixture being such as to give a weight ratio of water present in the mixture to lithium peroxide formed by the reaction of the hydrogen peroxide with the lithium hydroxide of from about 2:1 to about 5:1, permitting the hydrogen peroxide and the lithium hydroxide to react at the ambient temperature of the mixture, introducing a water-soluble organic liquid which is essentially a non-solvent with respect to lithium peroxide into the reaction mixture to inhibit solubilization of the lithium peroxide formed, separating the lithium peroxide from the reaction mixture, and drying the separated lithium peroxide.

6. A method of producing substantially anhydrous lithium peroxide comprising forming a reaction mixture consisting essentially of a water solution of hydrogen peroxide and a solid lithium hydroxide, the molar ratio of lithium hydroxide to hydrogen peroxide being greater than 2:1, the concentration of the hydrogen peroxide and the lithium hydroxide in the mixture being such as to give a weight ratio of water present in the mixture to lithium peroxide formed by the reaction of the hydrogen peroxide with the lithium hydroxide of from about 2:1 to about 5:1, permitting the hydrogen peroxide and the lithium hydroxide to react at the ambient temperature of the mixture, separating the lithium peroxide formed from the reaction mixture, and drying the separated lithium peroxide.

7. A method of producing substantially anhydrous lithium peroxide comprising forming a reaction mixture consisting essentially of a water solution of hydrogen peroxide and a solid lithium hydroxide, the molar ratio of lithium hydroxide to hydrogen peroxide being greater than 2:1, the concentration of the hydrogen peroxide and the lithium hydroxide in the mixture being such as to give a weight ratio of water present in the mixture to lithium peroxide formed by the reaction of the hydrogen peroxide with the lithium hydroxide of from about 2:1 to about 5:1, permitting the hydrogen peroxide and the lithium hydroxide to react at the ambient temperature of the mixture, introducing a water-soluble organic liquid which is essentially a non-solvent with respect to lithium peroxide into the reaction mixture to inhibit solubilization of the lithium peroxide formed, separating the lithium peroxide from the reaction mixture, and drying the separated lithium peroxide.

8. A method of producing substantially anhydrous lithium peroxide comprising forming a reaction mixture consisting essentially of a water solution of hydrogen peroxide and a solid lithium hydroxide, the molar ratio of lithium peroxide to hydrogen peroxide being between about 3:1 and 2:1, the concentration of the hydrogen peroxide and the lithium hydroxide in the mixture being such as to give a weight ratio of water present in the mixture to lithium peroxide formed by the reaction of the hydrogen peroxide with the lithium hydroxide of from about 2:1 to about 5:1, permitting the hydrogen peroxide and the lithium hydroxide to react at the ambient temperature of the reaction mixture until a change in color occurs in the reaction zone, introducing a water-soluble organic liquid which is essentially a non-solvent and substantially unreactive with respect to lithium peroxide into the reaction mixture to inhibit solubilization of the lithium peroxide formed, the volume ratio of organic liquid to water present in the reaction mixture being about 2:1 to about 1:2, separating the lithium peroxide from the reaction zone, and drying the lithium peroxide.

9. A method of producing substantially anhydrous lithium peroxide comprising providing a reaction mixture, in the form of a slurry, consisting essentially of at least a 27% water solution of hydrogen peroxide and solid lithium hydroxide, permitting the hydrogen peroxide and the lithium hydroxide to react at the ambient temperature of the slurry until the temperature of the slurry appreciably recedes, separating the lithium peroxide formed from the reaction mixture and drying the separated lithium peroxide.

10. A method of producing substantially anhydrous lithium peroxide comprising providing a reaction mixture, in the form of a slurry, consisting essentially of a 27% to 98% water solution of hydrogen peroxide and a solid lithium hydroxide monohydrate having a lithium hydroxide content of from about 50% to 60%, permitting the hydrogen peroxide and the lithium hydroxide monohydrate to react at the ambient temperature of the slurry until the temperature of the slurry recedes to a temperature in the range of from about room temperature to about 40° C., separating the lithium peroxide formed from the reaction mixture, and drying the separated lithium peroxide.

11. A method of producing substantially anhydrous lithium peroxide comprising providing a reaction mixture, in the form of a slurry, consisting essentially of a 27% to 98% water solution of hydrogen peroxide and a solid lithium hydroxide monohydrate having a lithium hydroxide content of from about 50% to 60%, permitting the hydrogen peroxide and the lithium hydroxide monohydrate to react at the ambient temperature of the slurry until the temperature of the slurry recedes to a temperature in the range of from about room temperature to about 40° C., contacting the slurry with a water-soluble organic liquid which is essentially a non-solvent and substantially unreactive with respect to lithium peroxide to inhibit solubilization in the water present in the reaction mixture of the lithium peroxide formed, separating said lithium peroxide from the reaction mixture, and drying the separated lithium peroxide.

12. A method of producing substantially anhydrous lithium peroxide comprising providing a reaction mixture, in the form of a slurry, consisting essentially of a 27% to 98% water solution of hydrogen peroxide and a solid lithium hydroxide monohydrate having a lithium hydroxide content of from about 50% to 60%, permitting the hydrogen peroxide and the lithium hydroxide monohydrate to react at the ambient temperature of the slurry until the temperature of the slurry recedes to a temperature in the range of from about room temperature to about 40° C., contacting the slurry with a water-soluble organic liquid which is essentially a non-solvent and substantially unreactive with respect to lithium peroxide to inhibit solubilization in the water present in the reaction mixture of the lithium peroxide formed, the volume ratio of organic liquid to water present in the reaction mixture being in the range of about 2:1 to about 1:2, separating said lithium peroxide from the reaction mixture, and drying the separated lithium peroxide.

13. A method of producing substantially anhydrous lithium peroxide comprising providing a reaction mixture, in the form of a slurry, consisting essentially of at least a 27% water solution of hydrogen peroxide and a solid lithium hydroxide monohydrate having a lithium hydroxide content of at least 50%, the monohydrate being in slight excess of stoichiometric proportions required to produce lithium peroxide, permitting the hydrogen peroxide and the lithium hydroxide monohydrate to react at the ambient temperature of the reaction mixture until a color change occurs in the reaction mixture, separating the lithium peroxide formed from the reaction mixture, and drying the separated lithium peroxide.

14. A method of producing substantially anhydrous lithium peroxide comprising providing a reaction mixture, in the form of a slurry, consisting essentially of at least a 27% water solution of hydrogen peroxide and a solid lithium hydroxide monohydrate having a lithium hydroxide content of at least 50%, the monohydrate being in slight excess of stoichiometric proportions required to produce lithium peroxide, permitting the hydrogen peroxide and the lithium hydroxide monohydrate to react at the ambient temperature of the reaction mixture until a color change occurs in the reaction mixture, introducing a water-soluble organic liquid which is essentially a non-solvent and substantially unreactive with respect to lithium peroxide to inhibit solubilization in the water present in the reaction mixture of the lithium peroxide formed, separating said lithium peroxide from the reaction mixture, and drying the separated lithium peroxide.

15. A method of producing substantially anhydrous lithium peroxide comprising providing a reaction mixture, in the form of a slurry, consisting essentially of an at least a 50% water solution of hydrogen peroxide and a solid lithium hydroxide monohydrate having a lithium hydroxide content of about 55%, the molar ratio of the monohydrate to the hydrogen peroxide being from about 3:1 to not less than 2:1, permitting the hydrogen peroxide and the lithium hydroxide monohydrate to react at the ambient temperature of the reaction mixture until the temperature of said reaction mixture recedes to a temperature within the range of about room temperature to about 40° C., introducing methanol into the reaction mixture to inhibit solubilization in the water present of the lithium peroxide formed, the volume ratio of the methanol to the water present in the reaction mixture being in the range of from about 2:1 to about 1:2, separating said lithium peroxide from the reaction mixture by filtration, and drying the separated lithium peroxide.

References Cited by the Examiner
UNITED STATES PATENTS 2,488,485 11/49 Winternitz _____ 23—184
2,962,358 11/60 Strater _____ 23—184

MAURICE A. BRINDISI, *Primary Examiner.*